(12) United States Patent  
Jurek et al.

(10) Patent No.: US 8,366,460 B2
(45) Date of Patent: Feb. 5, 2013

(54) WITHDRAWABLE CIRCUIT BREAKER SHUTTER SYSTEMS

(75) Inventors: Tomasz Ludwik Jurek, Pewel Mala (PL); Przemyslaw Marcin Dabrowski, Meszna (PL); Marcin Piotr Lagiewka, Bielsko-Biala (PL); Jacek Stanislaw Mrowiec, Bielsko-Biala (PL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/017,637

(22) Filed: Jan. 31, 2011

(65) Prior Publication Data

US 2012/0196461 A1  Aug. 2, 2012

(51) Int. Cl.
*H01R 25/00* (2006.01)
*H02B 1/26* (2006.01)
(52) U.S. Cl. ........................................ 439/113; 361/647
(58) Field of Classification Search .................. 439/113, 439/136; 361/647, 634, 638, 652, 653, 657; 200/50.21, 50.22
See application file for complete search history.

(56) References Cited

U.S. PATENT DOCUMENTS

| 4,285,026 | A | * | 8/1981 | Clausing | 361/617 |
| 4,686,334 | A | | 8/1987 | Nebon et al. | |
| 4,713,501 | A | * | 12/1987 | Herrmann | 200/50.22 |
| 5,343,355 | A | | 8/1994 | Ishikawa | |
| 5,486,978 | A | * | 1/1996 | Fishovitz | 361/617 |
| 7,022,923 | B2 | | 4/2006 | Liebetruth | |
| 7,067,746 | B2 | | 6/2006 | Deylitz | |
| 7,440,259 | B1 | * | 10/2008 | Deylitz et al. | 361/617 |
| 7,869,194 | B2 | * | 1/2011 | Deylitz et al. | 200/50.22 |
| 7,903,393 | B2 | | 3/2011 | Buxton et al. | |

OTHER PUBLICATIONS

European Search Report dated Aug. 28, 2012 for Application No. EP12152774.1; 5 pages.

* cited by examiner

*Primary Examiner* — Khiem Nguyen

(74) *Attorney, Agent, or Firm* — Cantor Colburn LLP

(57) ABSTRACT

An apparatus includes a first shutter, a first pivot arm having a first end and a second end, wherein the second end is disposed in mechanical communication with the first shutter, a second shutter, and a second pivot arm having a first end and a second end, wherein the second end is disposed in mechanical communication with the second shutter and the first end is disposed in mechanical communication with the first end of the first pivot arm. Linear movement of the first ends of the first and second pivot arms results in linear movement of the first shutter and the second shutter.

20 Claims, 9 Drawing Sheets

WITHDRAWABLE CIRCUIT BREAKER SHUTTER SYSTEMS

BACKGROUND OF THE INVENTION

The subject matter disclosed herein relates to circuit breakers, and more particularly, to automatic shuttering systems disposed to shield terminal contacts arranged to receive circuit breakers.

BRIEF DESCRIPTION OF THE INVENTION

According to at least one example embodiment, a shutter system includes a shutter housing defining a main plane, a window arranged on the main plane of the shutter housing, a base plate arranged on the shutter housing, the base plate defining a secondary plane, wherein the secondary plane is disposed perpendicular to the main plane, a first cutout and a second cutout, each cutout arranged on the base plate, wherein the first cutout has a length defining a first medial line that is substantially parallel to the main plane and the secondary plane, and wherein the second cutout has a length defining a second medial line that is substantially parallel to the main plane and the secondary plane, a first shutter disposed in mechanical communication with the first cutout and the shutter housing, wherein the first shutter is proximate to a first lateral portion of the window, a second shutter disposed in mechanical communication with the second cutout and the shutter housing, wherein the second shutter is proximate to a second lateral portion of the window, a first pivot arm disposed in mechanical communication with the first shutter, a second pivot arm disposed in mechanical communication with the second shutter, a pivot anchor disposed in mechanical communication with the first pivot arm and the second pivot arm, and a guiding rod arranged on the base plate and in mechanical communication with the pivot anchor, wherein the guiding rod has a length defining a third medial line arranged orthogonal to the main plane, orthogonal to the first line, orthogonal to the second medial line, and parallel to the secondary plane. Linear movement of the pivot anchor along the third medial line results in linear movement of the first shutter along the first medial line and linear movement of the second shutter along the second medial line.

According to at least one example embodiment, An apparatus includes a first shutter, a first pivot arm having a first end and a second end, wherein the second end is disposed in mechanical communication with the first shutter, a second shutter, and a second pivot arm having a first end and a second end, wherein the second end is disposed in mechanical communication with the second shutter and the first end is disposed in mechanical communication with the first end of the first pivot arm. Linear movement of the first ends of the first and second pivot arms results in linear movement of the first shutter and the second shutter.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Hereinafter, example embodiments of the present invention are described in detail. However, these embodiments may be varied in many ways. Thus, the following description is not intended to be limiting.

Figure 1:
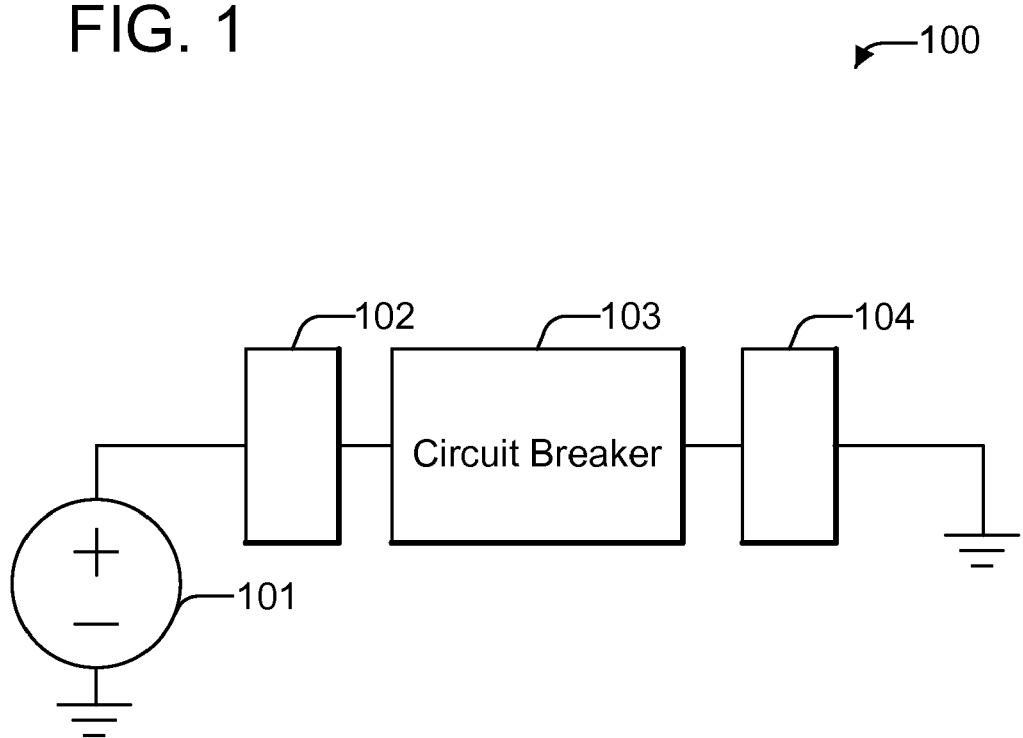
FIG. 1 illustrates a diagram of an electrical system.

Conventionally, DC electrical systems may include a DC circuit breaker arranged therein to provide over-current protection. Voltages of the DC electrical systems may be of a relatively large value depending upon any particular application. For example, FIG. 1 illustrates a diagram of a DC electrical system.

As illustrated, the system 100 may include a DC voltage source 101. The DC voltage source 101 may be any suitable source, for example a high-voltage DC bus, rectified AC source, or any other suitable voltage source. The system 100 may further include terminals 102 and 104. The terminals 102 and 104 may be electrically conductive terminals disposed to receive a DC circuit breaker 103. The terminals 102 and 104 may provide electrical power connections to the DC voltage source 101 and a ground and/or negative power connection to the DC voltage source 101. Thus, if the DC circuit breaker 103 is in operative communication with both terminals 102 and 104, the system 100 may be protected from excess current through operation of the DC circuit breaker 103.

As described above, voltages within a DC electrical system may quite high. It follows that as terminals 102 and 104 provide electrical power connections to the DC voltage source 101, any human contact or proximity to the terminals 102 and 104 may be undesirable. Example embodiments provide novel circuit breaker receiving modules with shutter portions arranged thereon to prevent or dissuade undesirable human contact with energized terminals.

Figure 2:
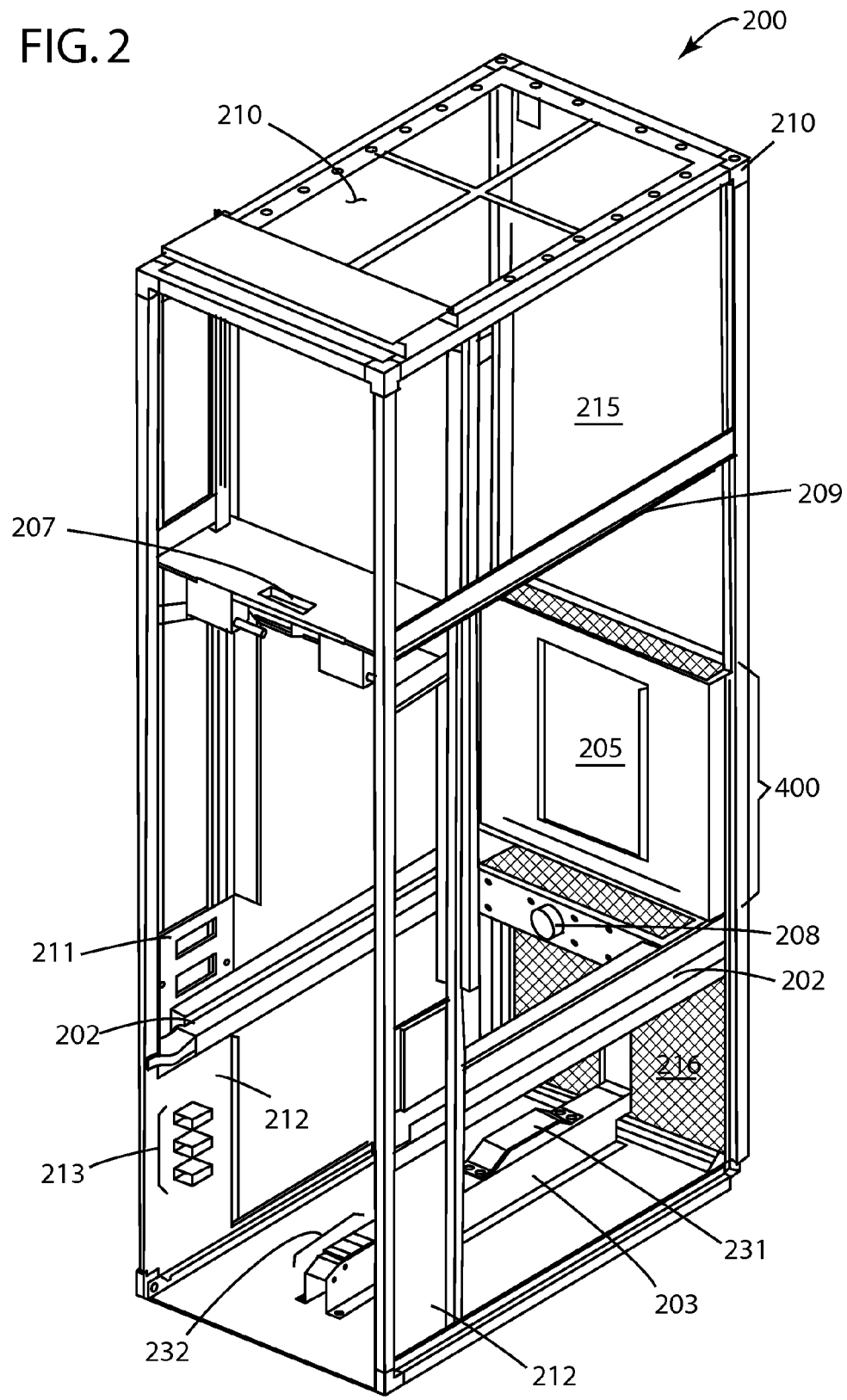
FIG. 2 illustrates a circuit breaker receiving module, according to an example embodiment.
Figure 3:
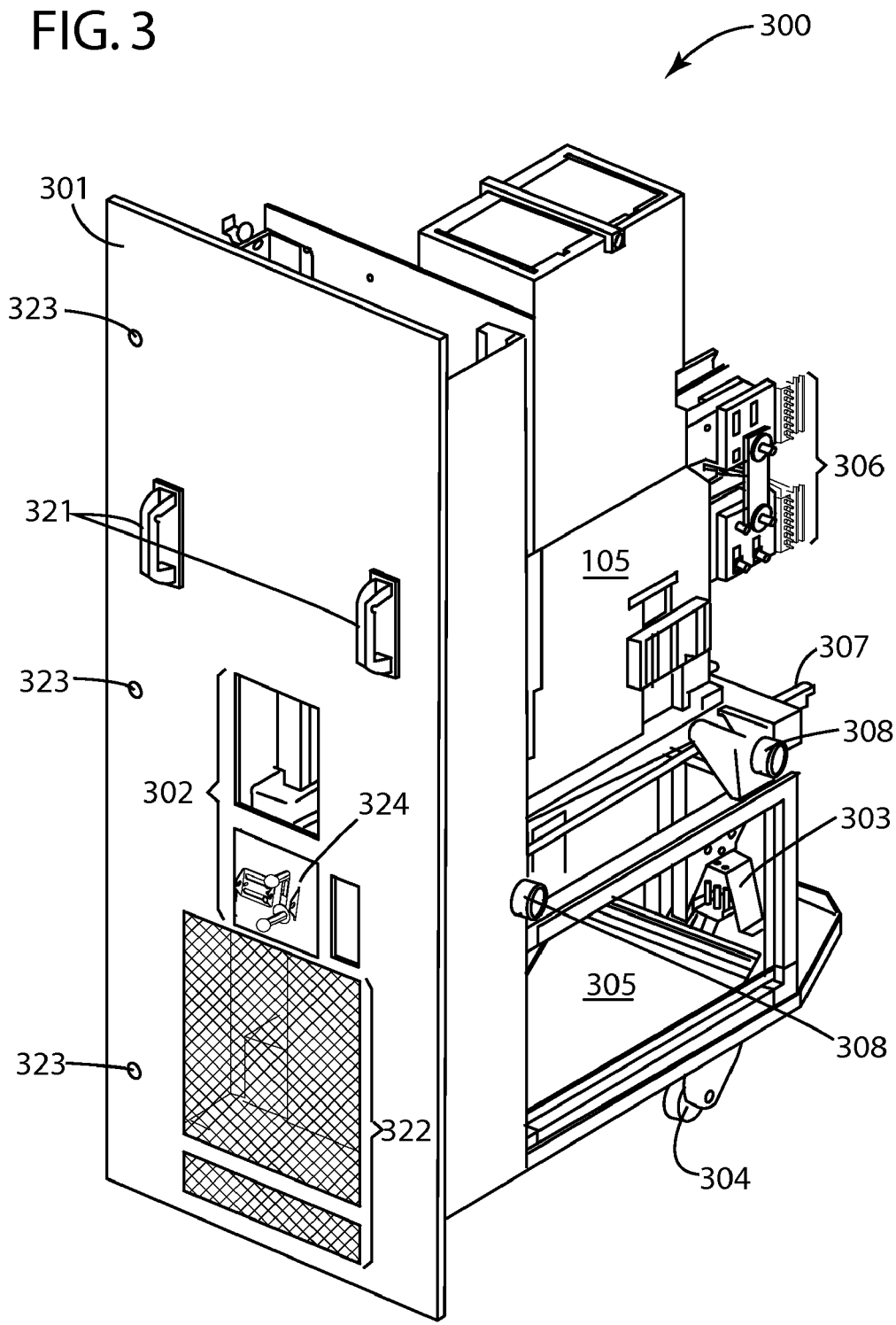
FIG. 3 illustrates a circuit breaker trolley, according to an example embodiment.

For example, FIG. 2 illustrates a circuit breaker receiving module, according to an example embodiment. The module 200 includes a structural housing 201. The structural housing 201 is disposed to receive a circuit breaker trolley 300, illustrated in FIG. 3 which is described in more detail hereinbelow.

The structural housing includes upper planar support platform 210 extending an entire length of the structural housing 201 from a frontal end of the structural housing 201 to a rear surface 215 of the structural housing 201. Further, the structural housing 201 includes rails 202 and side supports 209 arranged parallel to the upper planar support platform 210, which also extend the entire length of the structural housing 201.

The structural housing 201 further includes central bracket 203 arranged on a bottom surface of the structural housing 201. A first end of the central bracket 203 is arranged proximate a rear surface 216 of the structural housing 201, and a second end of the central bracket 203 is arranged between the frontal end of the structural housing 201 and the rear surface 216. An exemplary function of the central bracket 203 is to lock and limit motion of the circuit breaker trolley 300 within the structural housing 201.

The structural housing 201 further includes protective shutter portion 400 arranged thereon, proximate to both the rear surfaces 215 and 216. The shutter portion 400 is described more fully herein-below. The shutter portion 400 includes protective shutters 205, and shutter activation assembly 208. The shutter activation assembly 208 is disposed and configured to receive a shutter activation rod 307 arranged on the circuit breaker trolley 300, which is described more fully herein-below. The shutter activation assembly 208 includes a threaded bushing 501 configured to receive a drive screw 502 connected in collinear alignment with a guided path of the shutter activation rod 307. The guided path of the shutter activation rod 307 is a line orthogonal to planes formed by the rear surfaces 215 and 216. The drive screw 502 is affixed and/or attached to the shutter activation rod 307. Thus rotation of the shutter activation rod 307 rotates the drive screw 502 which engages the threaded bushing 503 in a similar manner as inserted or removing a conventional screw.

As noted above, FIG. 3 illustrates the circuit breaker trolley 300 disposed to be inserted within the structural housing 201, according to an example embodiment. The circuit breaker trolley 300 includes circuit breaker 103 arranged therein. The circuit breaker 103 includes terminal mating portions 306 disposed to mate with terminals arranged proximate the structural housing 201, protected by protective shutters 205. The circuit breaker trolley 300 further includes rollers 308 disposed to engage with support rails 202 of the structural housing 201. The circuit breaker trolley 300 further includes bottom surface 305, and rollers 304 arranged proximate the bottom surface 305. The rollers 304 are disposed to support the trolley 300 and facilitate movement of the trolley 300 outside of the structural housing 201. However, upon insertion of the trolley 300 within the structural housing 201, rollers 308 run onto rails 202 that are terminated with rising slots at the front side of the structural housing 201 in order to lift the trolley 300 so it starts rolling on the rollers 308. Rollers 304 are not in direct contact with a bottom surface of the structural housing 201. There may be any suitable number of rollers 304 arranged on the bottom surface.

The circuit breaker trolley 300 further includes front panel 301. The front panel 301 is arranged proximate the circuit breaker 103 on a frontal end of the circuit breaker trolley 300. The front panel 301 includes access features 302, which are disposed to allow operation of circuit breaker and interlocking control mechanisms 324. The front panel 301 further includes locks 323 arranged thereon. The locks 323 may be disposed to engage with the structural housing 201. The circuit breaker trolley 300 further includes vents 322 arranged thereon, which are disposed to allow ventilation of the circuit breaker 103. The circuit breaker trolley 300 further includes handle 321 arranged proximate the front panel 301, which are disposed to facilitate movement, insertion, and withdrawal of the circuit breaker trolley 300 to/from the structural housing 201.

Further illustrated is shutter activation rod 307. The shutter activation rod protrudes from a rear portion of the circuit breaker trolley 300. Further, a first end of the shutter activation rod may include an engagement means, the shutter activation rod engagement means may be accessed through access features 302, and a tool or rotation means may be rotated or turned thereby rotating the shutter activation rod 307. For example, a hand crank, motor, or other tool or rotation means may be attached to the shutter activation rod 307 at the engagement means thereby facilitating rotation. The activation means may be a lost, threaded hole or threaded exterior, notching, plurality of notching, geometrically shaped exterior, or any other suitable means.

As described above, the structural housing 201 is configured to receive the circuit breaker trolley 300. During receipt of the circuit breaker trolley 300, the shutter activation rod 307 should be rotated. Further, as the circuit breaker trolley is being received, rotational movement of the shutter activation rod 307 facilitates opening of the protective shutters 205, thereby allowing electrical communication between the circuit breaker 103 and terminals protected by the shutters 205. Even further, during extraction or withdrawal of the circuit breaker trolley 300, the shutter activation rod 300 should be rotated again. This additional rotational movement of the shutter activation rod facilitates closing of the shutters 205, thereby protecting said terminals upon the circuit breaker trolley's extraction.

The shutter activation and protection movements are described more fully below, with reference to FIGS. 4-9.

Figure 4:
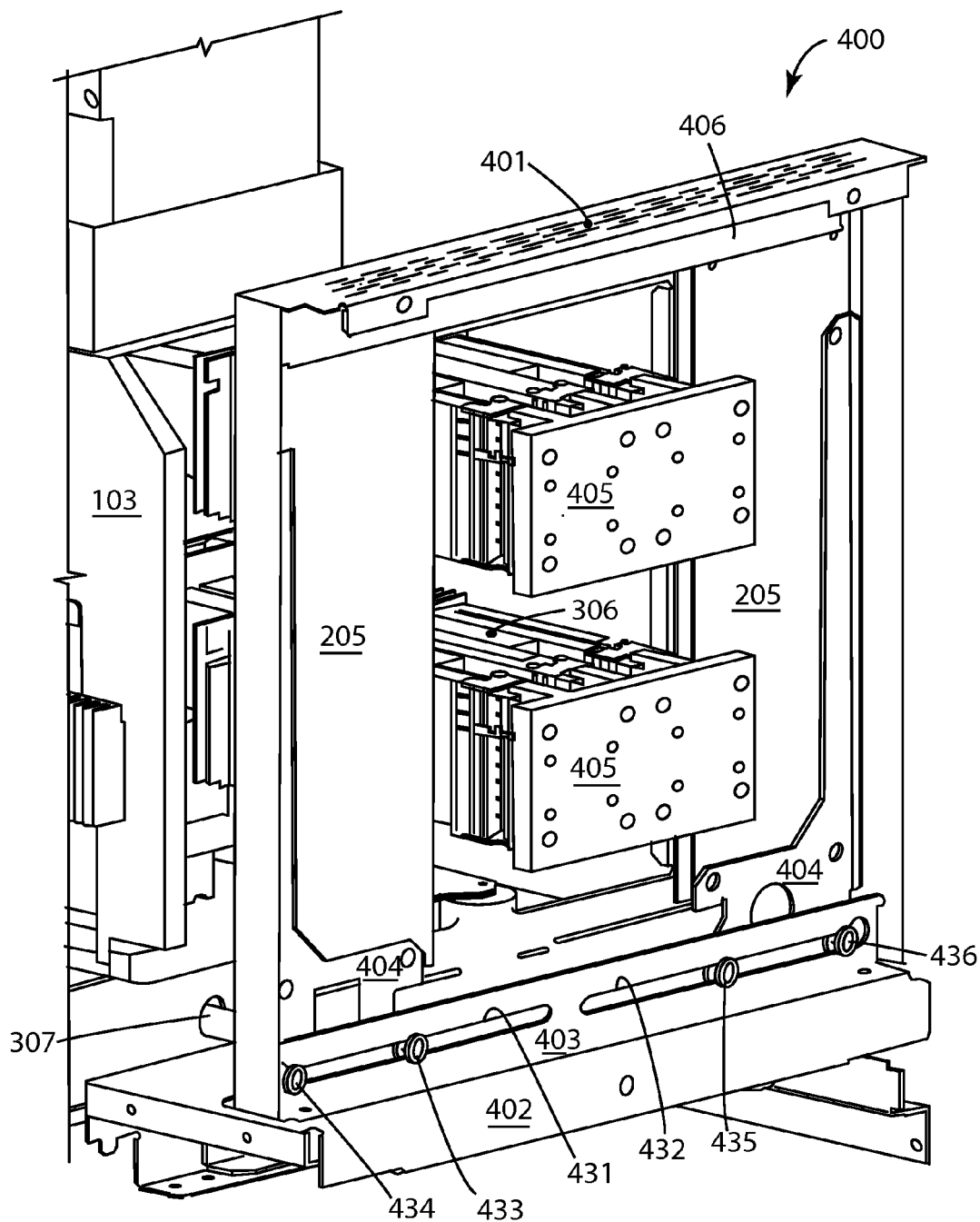
FIG. 4 illustrates a first view of a shutter portion of the circuit breaker receiving module, according to an example embodiment.

FIG. 4 illustrates a first view of the shutter portion 400 of the circuit breaker receiving module 200, according to an example embodiment. As illustrated, the shutter portion 400 includes housing 401. The housing 401 is arranged on base-plate 402. The base-plate 402 includes shutter rail 403 arranged thereon, and the housing 401 includes a second shutter rail 406 arranged thereon, opposite the shutter rail 403. The shutter rail 403 includes shutter roller cutouts 431 and 432. The shutter roller cutouts 431 and 432 are disposed to receive rollers 433, 434, 435, and 436. The rollers 433, 434, 435, and 436 are arranged on shutter support plates 404. As illustrated, two shutter support plates 404 are disposed to move between an open and closed position guided in near linear movement by the rollers 433, 434, 435, 436. The shutters 205 are arranged on and attached to the shutter support plates 404, for example with screws, bolts, rivets, or any suitable attachment means.

Figure 5:
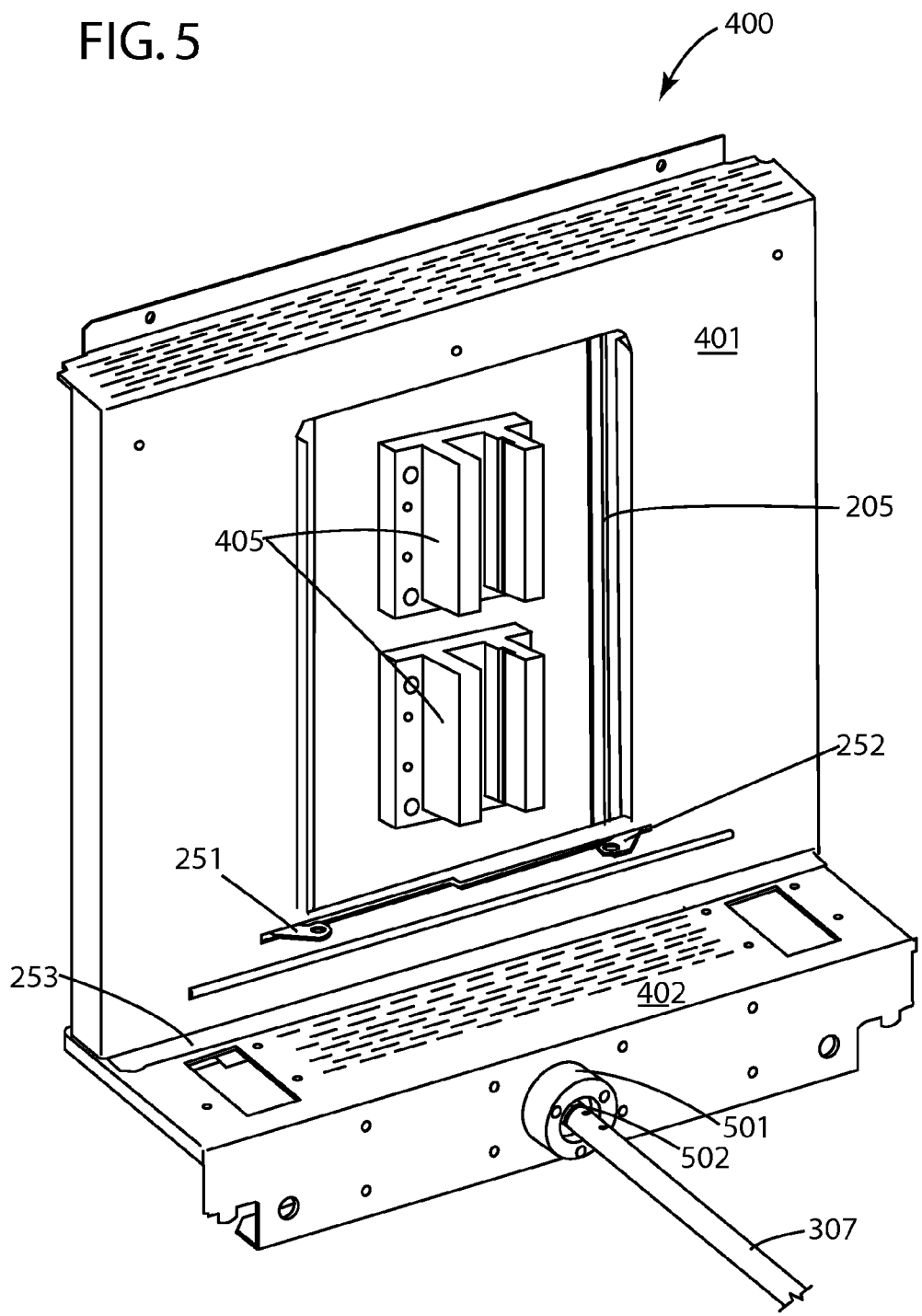
FIG. 5 illustrates a second view of the shutter portion of the circuit breaker receiving module, according to an example embodiment.

The shutters 205, as illustrated in FIG. 4, are in a fully open position. FIG. 5 illustrates a second view of the shutter portion 400 of the circuit breaker receiving module 200, with the shutters also in the fully open position, according to an example embodiment. As illustrated, the terminals 405 are exposed thereby facilitating receiving of the circuit breaker 103 arranged within the circuit breaker trolley 300. The opening of the shutters 205 is facilitated through rotational interaction of the shutter activation rod 307 which is in mechanical communication with threaded shutter activation bolt 502 that engages with threaded bushing 501. According to at least one example embodiment, the shutter activation rod 307 is fixedly attached to the shutter activation bolt 502 (e.g., welded, glued, etc). According to other example embodiments, the shutter activation rod 307 is in severable connection with the shutter activation bolt 502 (e.g., bolted, screwed, etc). If in a closed position, the shutters 205 may be locked through use of locking rings 251 and 252 which are attached to each shutter allowing for insertion of a pad lock or any suitable locking mechanism.

Figure 6:
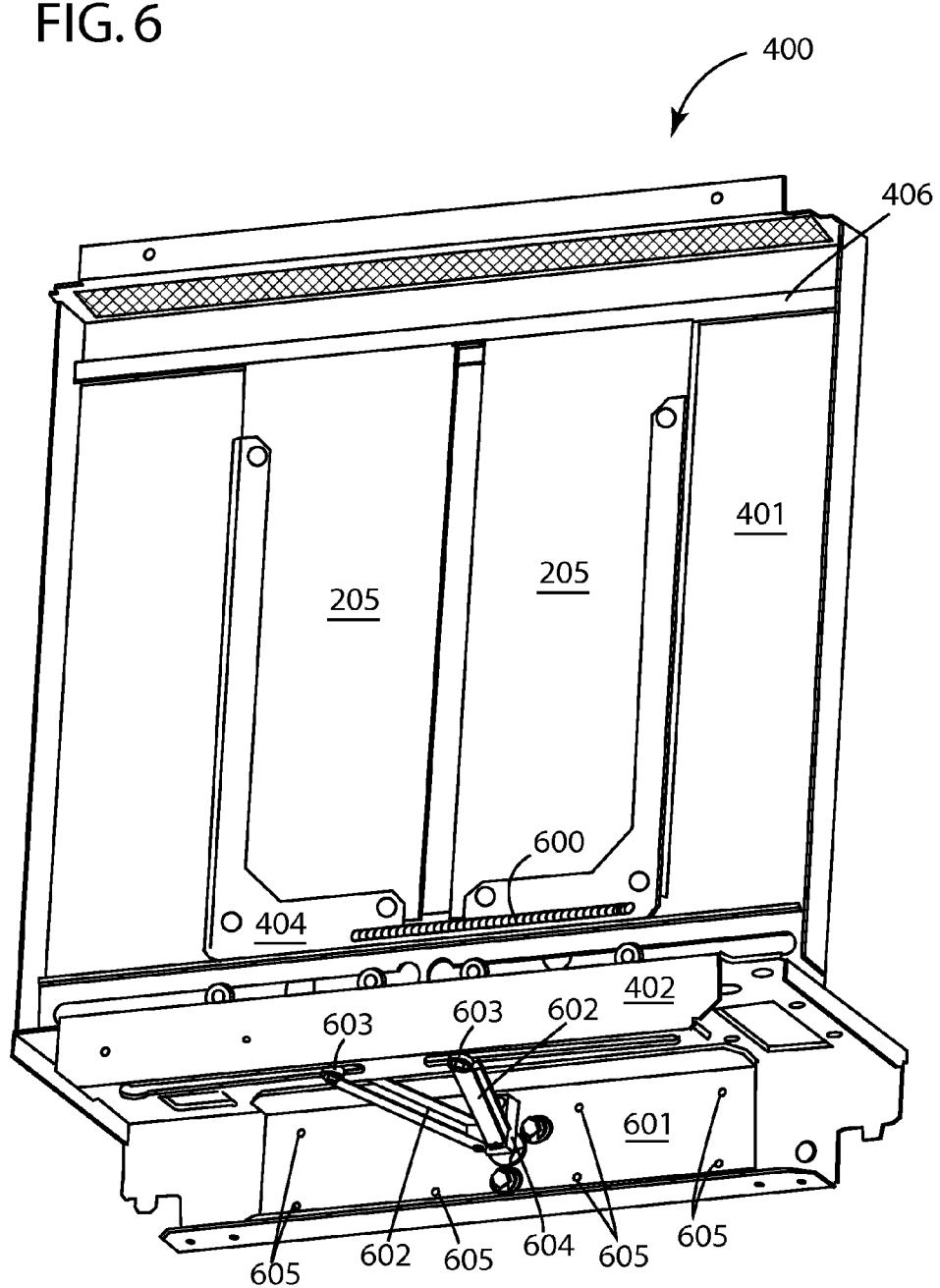
FIG. 6 illustrates a third view of the shutter portion of the circuit breaker receiving module, according to an example embodiment.

FIG. 6 illustrates a third view of the shutter portion 400 of the circuit breaker receiving module 200, according to an example embodiment. As illustrated, the shutter support plates 404 may include a tensioning spring 600 attached thereto. The tensioning spring 600 may facilitate assured closing of the shutters 205 during withdrawal of the circuit breaker trolley 300.

Figure 7:
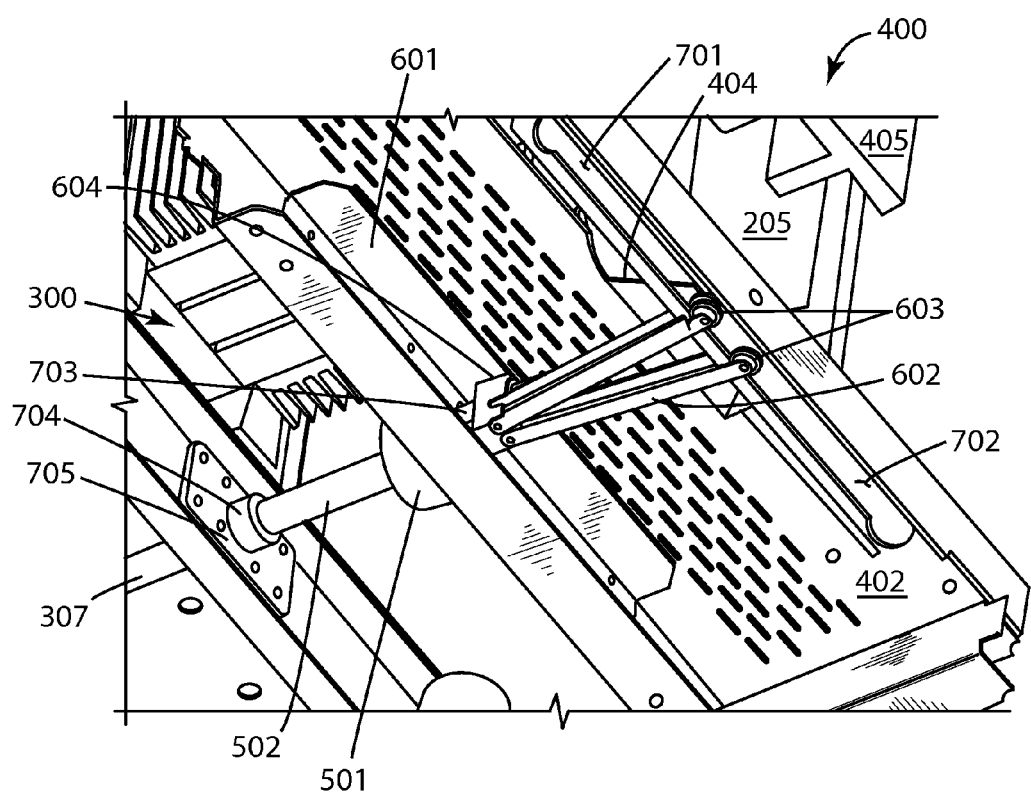
FIG. 7 illustrates a fourth view of the shutter portion of the circuit breaker receiving module, according to an example embodiment.

As further illustrated, the base plate 402 includes pivot support plate 601 arranged thereon, and attached thereon by attachment bolts 605. The attachment bolts 605 may be any suitable bolt, including self-tapping sheet metal screws/bolts, threaded bolts, rivets, or any suitable attachment means. The pivot support plate 601 is disposed to support a pivot assembly comprising pivot guide 703 (illustrated in FIG. 7), pivot anchor 604 and pivot arms 602, and the base plate 402 is disposed to receive pivot rollers 603. Turning now to FIG. 7 a more detailed view of the pivot assembly is illustrated.

FIG. 7 illustrates a fourth view of the shutter portion 400 of the circuit breaker receiving module, according to an example embodiment. As illustrated, the base plate 402 includes pivot roller cutouts 701 and 702, which are disposed to receive and guide pivot rollers 603. Furthermore, the pivot rollers 603 are attached to respective shutter support plates 402. Thus, as the pivot rollers move in a generally linear fashion within the cutouts 701, 702, the shutter support plates move into the open or closed position thereby opening or closing the shutters 205. For example, if the pivot anchor 604 is moved in a direction of a line orthogonal to a plane defined by the shutters 205, the shutters synchronously move towards or away from said orthogonal line. Thus, linear movement of the pivot anchor 604 is translated to linear movement of the shutters 205 through mechanical interaction between the pivot anchor 604, the pivot arms 602, the pivot rollers 603, the shutter support plates 402, and the shutters 205. Such movement may be considered somewhat similar to the mechanical movement of a pair or scissors, albeit in a somewhat more linear fashion. The movement of the pivot anchor 604 is facilitated through the rotational mechanical interaction between the shutter activation bolt 502, which is affixed/attatched to shutter activation rod 307. The shutter activation rod 307 is arranged through the circuit breaker trolley, being supported by bushing 704 and bushing support plate 705. Thus, the shutter activation rod 307 is free to rotate within the circuit breaker trolley 300.

Figure 8:
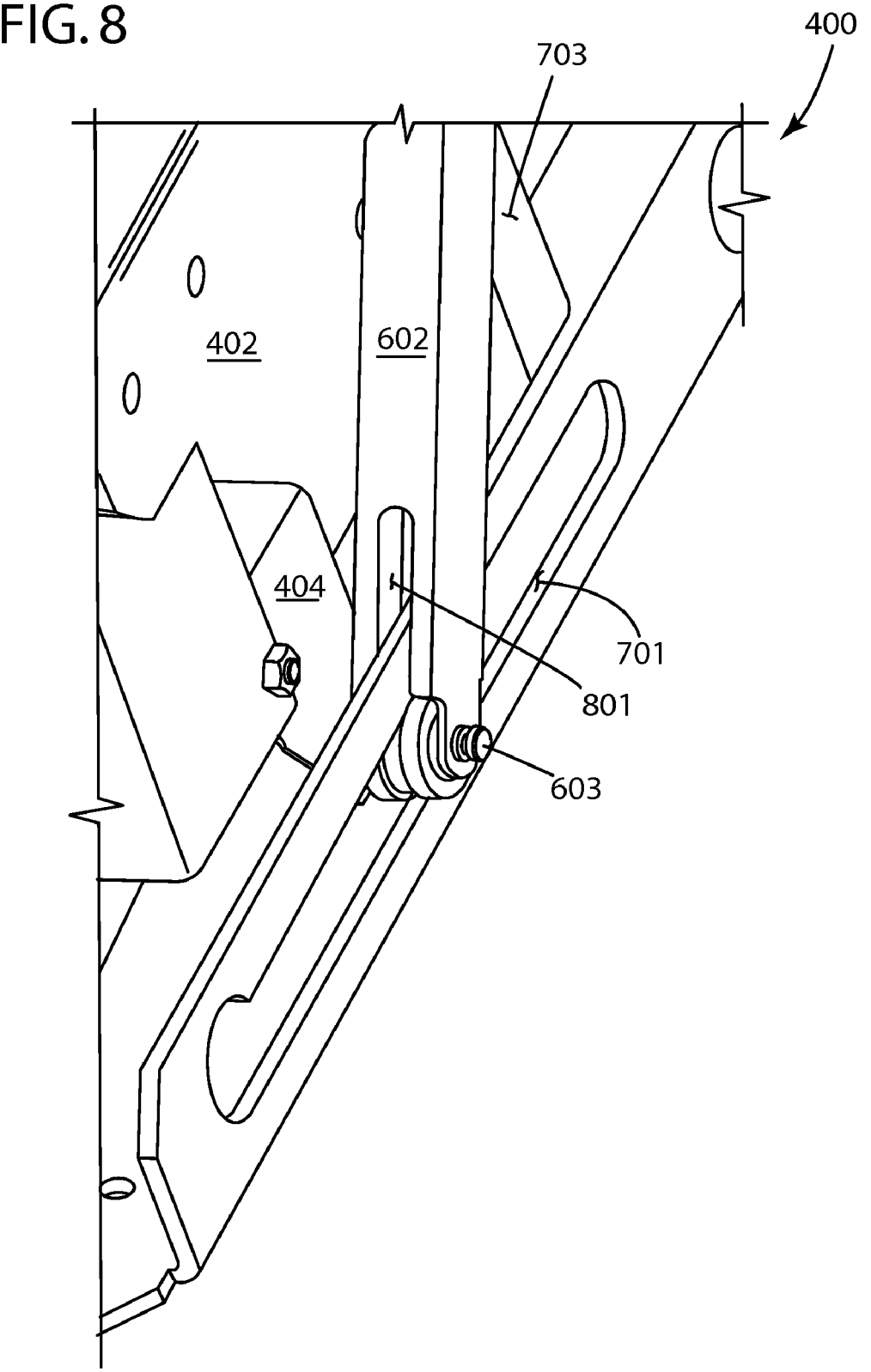
FIG. 8 illustrates a fifth view of the shutter portion of the circuit breaker receiving module, according to an example embodiment.
Figure 9:
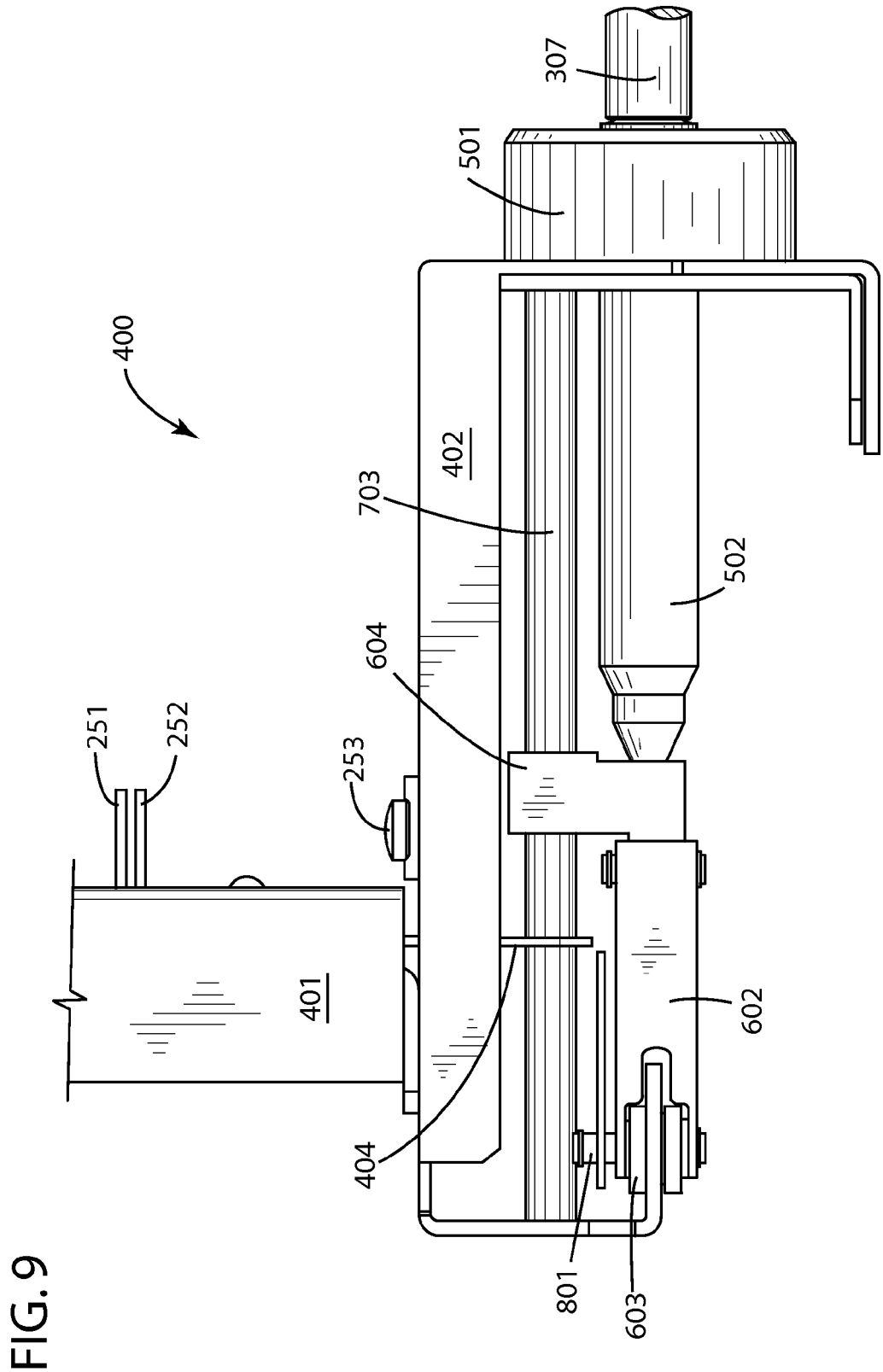
FIG. 9 illustrates a sixth view of the shutter portion of the circuit breaker receiving module, according to an example embodiment.

FIG. 8 illustrates a fifth view of the shutter portion 400 of the circuit breaker receiving module, according to an example embodiment. As illustrated, the pivot arms 602 each include a notch 801 formed as a lateral cutout following a plane formed parallel to the cutouts 701-702. Thus, each pivot arm 602 may freely move in a generally linear fashion along the cutouts 701-702, respectively.

Hereinafter opening and closing of the protective shutters 205 is described in detail. Making reference to FIGS. 5, 7, and 9, the arrangement of the shutter activation rod 307, the shutter activation bolt 502, and the shutter activation bushing 501 is illustrated. As previously described, the shutter activation bushing is threaded and receives the shutter activation bolt 502. Further, the shutter activation rod 307 is attached and configured to support the shutter activation bolt 502, and translate rotational movement similar to the application of rotational force to insert or extract a conventional bolt or screw.

As the shutter activation bolt 502 is rotated, the pivot anchor 604 is forced to move in the linear fashion described above. The resulting linear movement thus forces the pivot arms 602 to translate said linear movement orthogonally to the shutter support plates 402 along paths defined by the cutouts 701-702. It is noted that the shutter activation bolt may be rotated similarly to a conventional bolt or screw, thus allowing linear motion of the pivot anchor in two directions, which facilitates both opening and closing of the shutters 205 during insertion and withdrawal of the circuit breaker trolley 300.

Thus, as described above, example embodiments of the present invention provide circuit breaker trolleys and circuit breaker receiving modules. The circuit breaker receiving modules include protective shutters that, upon receiving mechanical forces translated from rotational force applied during circuit breaker trolley receipt or withdrawal, automatically open/close. The rotational force is applied at a frontal end of the circuit breaker trolley during trolley insertion to facilitate insertion of a shutter activation bolt through a threaded shutter activation bushing. During insertion, linear motion of an end of the shutter activation bolt forces linear motion of a pivot anchor in the same linear direction. The motion of the pivot anchor is translated through two pivots attached thereto to shutter support plates which synchronously move along lines substantially orthogonal to a line defined by the linear motion of the pivot trolley. Further, a tensioned spring may be attached to each shutter support plate to facilitate closing of the shutter support plates during extraction of the shutter activation bolt. The extraction and insertion of the shutter activation bolt is facilitated through its rotation inside of the bushing 501.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A shutter system for preventing contact with electrical terminals, comprising:
    a shutter housing defining a main plane;
    a window arranged on the main plane of the shutter housing;
    a base plate arranged on the shutter housing, the base plate defining a secondary plane, wherein the secondary plane is disposed perpendicular to the main plane;
    a first cutout and a second cutout, each cutout arranged on the base plate, wherein the first cutout has a length defining a first medial line that is substantially parallel to the main plane and the secondary plane, and wherein the second cutout has a length defining a second medial line that is substantially parallel to the main plane and the secondary plane;
    a first shutter disposed in mechanical communication with the first cutout and the shutter housing, wherein the first shutter is proximate to a first lateral portion of the window;

a second shutter disposed in mechanical communication with the second cutout and the shutter housing, wherein the second shutter is proximate to a second lateral portion of the window;

a first pivot arm disposed in mechanical communication with the first shutter;

a second pivot arm disposed in mechanical communication with the second shutter;

a pivot anchor disposed in mechanical communication with the first pivot arm and the second pivot arm; and a guiding rod arranged on the base plate and in mechanical communication with the pivot anchor, wherein the guiding rod has a length defining a third medial line arranged orthogonal to the main plane, orthogonal to the first medial line, orthogonal to the second medial line, and parallel to the secondary plane;

wherein linear movement of the pivot anchor along the third medial line results in linear movement of the first shutter along the first medial line and linear movement of the second shutter along the second medial line.

2. The system of claim 1, further comprising:

a first pivot roller arranged on a first end of the first pivot arm, wherein the first pivot roller is arranged within the first cutout and wherein the first pivot roller is in mechanical communication with the first shutter; and a second pivot roller arranged on a first end of the second pivot arm, wherein the second pivot roller is arranged within the second cutout and wherein the second pivot roller is in mechanical communication with the second shutter.

3. The system of claim 2, further comprising:

a first shutter support plate proximate the first shutter and in mechanical communication with the first pivot roller; and a second shutter support plate proximate the second shutter and in mechanical communication with the second pivot roller.

4. The system of claim 3, further comprising a spring, wherein a first end of the spring is attached to the first shutter support plate and a second end of the spring is attached to the second shutter support plate.

5. The system of claim 4, wherein force provided by the spring is along a medial line parallel to the main plane.

6. The system of claim 5, wherein force provided by the spring is mechanically communicated to the pivot anchor as force along a medial line coplanar with the third medial line.

7. The system of claim 1, further comprising a threaded shutter activation bushing arranged on the base plate, wherein the threaded shutter activation bushing is configured to receive a threaded shutter activation bolt.

8. The system of claim 7, wherein rotational movement of the shutter activation bolt is mechanically converted to linear movement of the pivot anchor along the third medial line.

9. An apparatus for preventing contact with an electrical terminal, comprising:

a first shutter;

a first pivot arm having a first end and a second end, wherein the second end is disposed in mechanical communication with the first shutter;

a second shutter;

a second pivot arm having a first end and a second end, wherein the second end is disposed in mechanical communication with the second shutter and the first end is disposed in mechanical communication with the first end of the first pivot arm;

wherein linear movement of the first ends of the first and second pivot arms results in a pivot of the first and second pivot arms around the first ends of the first and second pivot arms and linear movement of the first shutter and the second shutter, a pivot axis of the first end of the first pivot arm being fixed with respect to a pivot axis of the first end of the second pivot arm during the linear movement of the first ends of the first and second pivot arms.

10. The apparatus of claim 9, further comprising:

a first pivot roller arranged on the first end of the first pivot arm, arranged to travel along a cutout and wherein the first pivot roller is in mechanical communication with the first shutter; and a second pivot roller arranged on the first end of the second pivot arm, wherein the second pivot roller is arranged to travel along a second cutout and wherein the second pivot roller is in mechanical communication with the second shutter.

11. The apparatus of claim 10, further comprising:

a first shutter support plate proximate the first shutter and in mechanical communication with the first pivot roller; and a second shutter support plate proximate the second shutter and in mechanical communication with the second pivot roller.

12. The apparatus of claim 11, further comprising a spring, wherein a first end of the spring is attached to the first shutter support plate and a second end of the spring is attached to the second shutter support plate.

13. The apparatus of claim 12, wherein force provided by the spring is parallel to the main plane.

14. The apparatus of claim 13, wherein force provided by the spring is mechanically communicated to the first and second shutters.

15. The apparatus of claim 9, further comprising a threaded shutter activation bushing arranged proximate the first and second shutters, wherein the threaded shutter activation bushing is configured to receive a threaded shutter activation bolt.

16. The apparatus of claim 15, wherein rotational movement of the shutter activation bolt is mechanically converted to linear movement of the first and second shutters.

17. The apparatus of claim 9, wherein the second shutter is located on a same plane with the first shutter in an open position and a closed position of the first shutter and the second shutter.

18. An apparatus for preventing contact with electrical terminals, comprising:

a first shutter;

a first pivot arm having a first end and a second end, wherein the second end is disposed in mechanical communication with the first shutter;

a second shutter;

a second pivot arm having a first end and a second end, wherein the second end is disposed in mechanical communication with the second shutter and the first end is disposed in mechanical communication with the first end of the first pivot arm; and a threaded shutter activation bushing arranged proximate the first and second shutters, wherein the threaded shutter activation bushing is configured to receive a threaded shutter activation bolt, and the threaded shutter activation bolt is configured such that a rotational movement of the shutter activation bolt is mechanically converted to linear movement of the first and second shutters, wherein linear movement of the first ends of the first and second pivot arms results in linear movement of the first shutter and the second shutter.

19. The apparatus of claim 18, further comprising:

a first pivot roller arranged on the first end of the first pivot arm, arranged to travel along a cutout and wherein the first pivot roller is in mechanical communication with the first shutter; and a second pivot roller arranged on the first end of the second pivot arm, wherein the second pivot roller is arranged to travel along a second cutout and wherein the second pivot roller is in mechanical communication with the second shutter.

20. The apparatus of claim 19, further comprising:

a first shutter support plate proximate the first shutter and in mechanical communication with the first pivot roller; and a second shutter support plate proximate the second shutter and in mechanical communication with the second pivot roller.

* * * * *

UNITED STATES PATENT AND TRADEMARK OFFICE
CERTIFICATE OF CORRECTION

PATENT NO. : 8,366,460 B2
APPLICATION NO. : 13/017637
DATED : February 5, 2013
INVENTOR(S) : Jurek et al.

Page 1 of 1

It is certified that error appears in the above-identified patent and that said Letters Patent is hereby corrected as shown below:

In Column 5, Line 27, delete "402." and insert -- 404. --, therefor.

In Column 5, Line 39, delete "402," and insert -- 404, --, therefor.

In Column 6, Line 5, delete "402" and insert -- 404 --, therefor.

Signed and Sealed this
Second Day of April, 2013

Teresa Stanek Rea
*Acting Director of the United States Patent and Trademark Office*